United States Patent [19]

Bell et al.

[11] Patent Number: 4,661,941

[45] Date of Patent: Apr. 28, 1987

[54] OPTICAL VIDEO OR DATA TAPE RECORD AND PLAYBACK APPARATUS

[75] Inventors: Alan E. Bell, East Windsor; Fred W. Spong, Lawrenceville, both of N.J.

[73] Assignee: RCA Corporation, Princeton, N.J.

[21] Appl. No.: 76,752

[22] Filed: Sep. 18, 1979

[51] Int. Cl.⁴ .......................... G11B 7/00; G01D 9/42
[52] U.S. Cl. .................................. 369/111; 346/76 L;
     346/108; 346/109; 369/44; 369/47; 369/110
[58] Field of Search .................. 358/6, 7, 8, 130, 302,
     358/347; 346/76 L, 108, 109; 369/44, 111, 110, 47

[56] References Cited

U.S. PATENT DOCUMENTS

| | | | |
|---|---|---|---|
| 3,314,074 | 4/1967 | Becker | 346/108 |
| 3,314,075 | 4/1967 | Becker et al. | 346/108 |
| 3,474,457 | 10/1969 | Becker | 346/76 L |
| 3,654,624 | 4/1972 | Becker et al. | 346/76 L |
| 3,656,175 | 4/1972 | Carlson et al. | 346/108 |
| 3,806,643 | 4/1974 | Russell | 358/302 |
| 4,030,122 | 6/1977 | Chemell et al. | 358/127 |

Primary Examiner—Stephen C. Buczinski
Attorney, Agent, or Firm—Joseph S. Tripoli

[57] ABSTRACT

A record/playback apparatus is provided for recording/reproducing information signals in cooperation with an optical tape medium. The record apparatus comprises a laser source which is modulated in accordance with the information signals. A switching mirror, which is interposed between the laser source and the optical tape, switches the light beam emitted by the source to alternately scan helical tracks across an optical tape. In the playback mode a light detector is arranged to intercept the light reflected from the optical tape. The reflected light contains the information which was recorded on the optical tape during the recording operation.

8 Claims, 9 Drawing Figures

FIELD I.D. NUMBER

OPTICAL VIDEO OR DATA TAPE RECORD AND PLAYBACK APPARATUS

The Government has rights in this invention pursuant to Contract No. 78F-111120 awarded by the U.S. Government.

The present invention relates generally to optical record and playback systems and particularly to optical tape record and playback systems for recording and reproducing video information signals.

Prior art information storage and retrieval systems utilize magnetic, photographic and electron beam techniques to record information signals on various media such as tape, disc and drum surfaces. In magnetic systems, the packing density is limited by parameters such as the recording device utilized and the recording speed and the life of the recording medium is affected by the mechanical relationship between the recording medium and the recording head. In photographic systems, the processing step between recording and reproducing does not permit instantaneous reproduction of the recorded information. Although electron beam recording techniques provide reasonably high information packing density, without headwear problems, electron beam recording must be performed within a vacuum chamber. That places severe environmental limitations on the recording system.

In accordance with the principles of the present invention, an optical tape record and playback apparatus, which avoids some of the aforementioned problems and disadvantages of prior art magnetic, photographic and electron beam record and playback apparatus, is provided.

Further, in accordance with the principles of the present invention, an apparatus for recording information signals onto an optical tape record medium is provided. The apparatus comprises a source of radiant energy providing a beam of coherent light which is modulated in accordance with the information signals. The apparatus further comprises means for guiding the optical tape record medium in a substantially 180° arc adjacent to a rotatable support. First and second means for focusing the coherent light beam to a spot on the optical tape record medium are attached to the rotatable support. To effect a helical scan of the optical tape record medium along the arc established by the guiding means by the focused light spots of the coherent light beam, means are provided for establishing relative motion between the rotatable support and the optical tape record medium. Additionally, the apparatus comprises switching means and directing means. The switching means, which is interposed between the source of radiant energy and the rotatable support, shifts the coherent light beam alternately between the first focusing means during a first time interval during which the tape is helically scanned and the second focusing means during a second time interval during which the tape is helically scanned. The directing means which directs the light beam to the focusing means is attached to the rotatable support. The light beam which approaches the rotatable support from a first direction during the first interval is directed to the first focusing means by the directing means while the light beam which approaches the rotatable support from a direction opposite to the first direction during the second interval is directed to the second focusing means.

In further accordance with the principles of the present invention, an apparatus for reproducing information signals recorded on an optical tape record medium is provided. This apparatus comprises a source of radiant energy providing a beam of coherent light. Further, means for guiding the optical tape record medium in a substantially 180° arc adjacent to a rotatable support is provided. Attached to the rotatable support are first and second means for focusing the coherent light beam to a spot on the optical tape record medium. A means is provided for establishing relative motion between the rotatable support and the optical tape record medium such that the focused light spot of the coherent light beam scans the optical tape record medium in a helical fashion along the arc established by the guiding means. Additionally, the apparatus comprises switching means and directing means which are similar in all respects to the switching means and directing means described above with regard to the record apparatus. Further, the reproducing apparatus includes light detection means, responsive to the light beam reflected from the optical tape record medium during the occurrence of the relative motion, for developing electrical signals representative of the recorded information signals.

Figure 1:
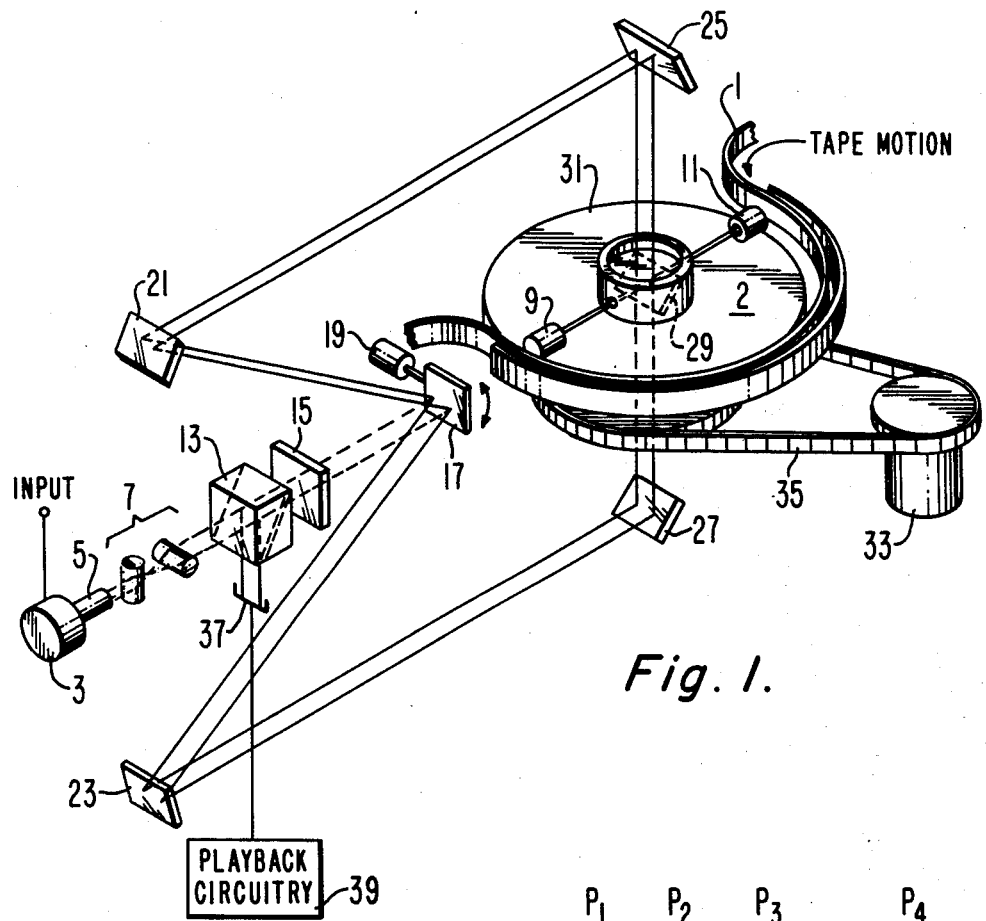
FIG. 1 is a perspective view of an optical tape record and playback apparatus in accordance with the present invention.

FIG. 1 illustrates a record/playback apparatus in accordance with the present invention. For an explanation of the operation of the illustrated apparatus, it should be assumed that recording medium or tape 1 which is moved from a supply reel (not shown) to a take-up reel (not shown) around a substantially 180° arc of recording station 2 is a plastic (e.g., polyester) backed tape having a coating structure which is highly absorptive in the recording mode.

Figure 2:
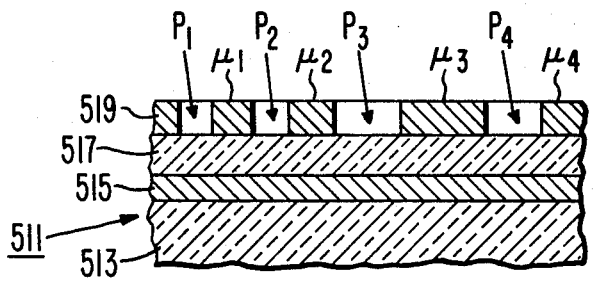
FIG. 2 is a cross-sectional view of a recording medium suitable for use in the optical tape record and playback apparatus of FIG. 1.

FIG. 2 illustrates a cross-sectional view of a record medium which can be used with the apparatus of FIG. 1. The record medium 511 includes a base material 513 (e.g., plastic) which is illustratively formed in the shape of a tape. Overlying the base material 513 is a thin layer 515 of a material exhibiting reasonably high reflectivity to light from laser 3 of FIG. 1 (e.g., a GaAs laser which emits a light beam having a wavelength of 8000Å). Illustratively, reflective layer 515 may be in the form of a 600Å thick layer of aluminum deposited by an evaporation process. Overlying the reflective layer 515 is a layer 517 of a material which is transparent to light from laser 3. Illustratively, layer 517 may be in the form of a 525Å thick layer of silicon dioxide. A thin layer 519 of a material which is absorptive to light from laser 3 overlies the transparent layer 517. Illustratively, layer 519 may be in the form of 60Å thick layer of tellurium. The layer thickness and materials of the record medium 511 are chosen such that record medium 511 exhibits a substantially anti-reflective effect when exposed with a light beam having a wavelength of 8000Å. Such a structure provides a highly absorptive, highly sensitive recording medium.

As shown in the cross-section in FIG. 2, an information track is established in the absorptive coating 519. The information track comprises a succession of spaced pits ($p_1$, $p_2$, $p_3$, $p_4$) in which the absorptive layer 519 is removed, separated by regions ($u_1$, $u_2$, $u_3$, $u_4$) in which the absorptive layer 519 is undisturbed. During the recording process, record medium 511 is moved relative to the light beam emitted from laser 3 (the motion of record medium 511 will be described infra with respect to the operation of FIG. 1). During the occurrence of this relative motion, the intensity of the light beam is controlled in accordance with a recording information signal to form pits, such as $p_1$–$p_4$, which pits are representative of the information to be recorded.

The result of the above-described recording process is the formation of an information record having an information track which comprises undisturbed regions that exhibit reasonably low reflectance at the appropriate light frequency (due to the anti-reflective layer thickness choices described previously) alternating with pit regions, formed during the recording process by melting or ablating portions of layer 519, that exhibit high reflectivity at the appropriate light frequency. During information recovery a high readout contrast ratio is effected between the reflectance of the pits and the anti-reflectance of the intervening (undisturbed) regions.

Referring again to FIG. 1, laser 3 emits a non-circular coherent light beam into collecting objective 5. The collecting objective 5 captures substantially all of the emitted coherent radiation from laser 3 and images the non-circular beam onto the cylindrical beam expander 7. Beam expander 7 shapes the beam into a circular cross-section and expands the beam such that it substantially fills the aperture of focusing objectives 9, 11. From beam expander 7, the beam is transmitted through polarized beam splitter 13 and quarter-wave plate 15 to switching mirror 17. The operation of polarized beam splitter 13 and quarter-wave plate 15 will be explained in detail herein.

Galvanometer 19, attached to switching mirror 17, causes switching mirror 17 to seesaw back and forth such that the light beam reflected by switching mirror 17 alternately impinges on fixed mirrors 21 and 23. Mirrors 21 and 23 reflect the light beam to mirrors 25 and 27, respectively. From mirror 25 the light beam is directed to mirror 29 which reflects it so that it passes through objective 9 to impinge on record medium 1 while the light beam from mirror 27 is directed to mirror 29 which reflects it so that it passes through objective 11 to impinge on record medium 1. The light beam which enters objectives 9, 11 has been expanded by the optical elements 5, 7 such that the apertures of objectives 9, 11 are substantially filled. Objectives 9, 11 which have a high numerical aperture (i.e. on the order of 0.5) focus the light beam on the surface of record medium 1.

Objective lenses 9, 11 and mirror 29 are mounted on rotatable support 31. Rotatable support 31 is coupled to motor 33 by belt 35. During recording and playback operations, rotatable support 31 is driven by motor 33 and belt 35.

To maintain proper focus of the spot on record medium 1 objective lenses 9, 11 are each provided with a voice coil actuated type positioning mechanism (not shown). The voice coil mechanism in cooperation with suitable sensing means (e.g., capacitive type distance sensor) maintains the light beam in focus on the surface of the record medium 1. For an example of the operation of a voice coil actuated lens positioning means and capacitance sensing means, reference should be made to U.S. patent application No. 777,477 now Pat. No. 4,300,226 to W. E. Barnette et al. filed on Mar. 14, 1977.

The utilization of the apparatus of FIG. 1 for recording information will now be explained. Information signals which may be in the form of composite video signals with sound accompaniment are modulated and provided at laser 3 (illustratively, a color television signal of the NTSC format is frequency modulated over a deviation range of 7–10 MHz). The output light intensity of laser 3 is shifted between high and low levels in consonance with the modulated information signals. In the record mode, the high level intensity of laser 3 is sufficient to ablate, vaporize or evaporate the absorptive coating 519 of record medium 511 while the low level intensity is insufficient to effect removal of coating 519.

As described above, objective lenses 9, 11 and mirror 29 are mounted on rotatable support 31 which is driven by motor 33. Rotatable support 31 is positioned at a slight angle with respect to the axis formed by cutting through the center of mirrors 25 and 27.

Figure 3:
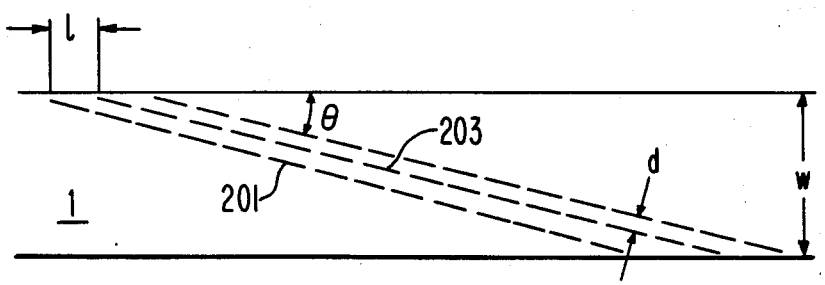
FIG. 3 is a plan view of the recording medium illustrating helical scan lines.

Record medium 1 is driven by the take-up reel around the 180° arc of the recording station 2. The relative motion established between the light beam focused by objective lens 9 or 11 and record medium effects a helical scan of record medium 1 by the focused spot. This helical scan which results from the slightly angled orientation of support 31 relative to the mirror system forms a trace 201 across record medium 1 as shown in FIG. 3. Switching mirror 17 effects a scanning of successive trace lines 201, 203 across record medium 1 by alternately directing the light beam to objective lens 9 and objective lens 11 as each objective lens respectively scans the length of recording medium 1 traversing the 180° arc between lenses 9 and 11.

To effect non-segmented scanning of color television signals of the NTSC format, rotatable support 31 is rotated at 1800 RPM and mirror 17 is switched at the field rate. The length of the 180° arc or diameter of recording station 2 is determined by the video signal bandwidth, the duration of one field of video and the diameter of the record beam focused spot. Assuming an 8 MHz bandwidth, a field rate of 1/60 second and a spot size of $8 \times 10^{-5}$ cm., the diameter of recording station 2 would be about 14 cm. The tape speed is dependent upon the tape width, length of the 180° arc and the track-to-track spacing. Referring to FIG. 3, if the tape width w is 1 cm., length of the 180° arc is 14·II/2 cm. and the track-to-track spacing d is $2\mu$, then the tape velocity will be 0.26 cm/sec or 0.10 inches/second.

In the playback mode laser 3 is biased to emit a linearly polarized continuous light beam of an intensity insufficient to disturb the absorptive layer of record medium 1. The polarization of laser 3 is oriented such that the playback light beam passes through the polarized beam splitter 13 as it approaches quarter-wave plate 15. The laser beam follows the previously described path (via elements 15, 17, 21, 25, 29 or 15, 17, 23, 27, 29) to lens 9 or 11 which focuses the beam on the desired information track of record medium 1. Light reflected from the information track is returned via elements 29, 25, 21 or 29, 27, 23 to quarter-wave plate 15 and beam splitter 13. As the returned light has made two passes through quarter-wave plate 15 its polarization has been altered to a direction which results in reflection of the returned light by beam splitter 13 to photodetector 37.

The intensity of the light falling upon photodetector 37 alternates between a maximum level and a minimum level as the successive regions ($p_1$, $u_1$, $p_2$, $u_2$, etc.) of the information track pass through the path of the focused beam. The maximum intensity level for light reaching photodetector 37 is obtained when a pit ($p_1$, $p_2$, etc.) of the absorptive layer is in the focused beam path, while the minimum intensity level for light reaching photodetector 37 is obtained when an undisturbed region ($u_1$, $u_2$, etc.) is in the focused beam path.

The output of photodetector 37 comprises carrier waves with zero crossings recurring at frequencies varying in consonance with the pit edge spacing variations. The information signals previously recorded on the record medium are retrieved at the output of the playback circuitry 39. When a color television signal has been recorded on the record medium 1 the output of the playback circuitry may be applied to a color television receiver to view the recorded television signals.

Figure 4:
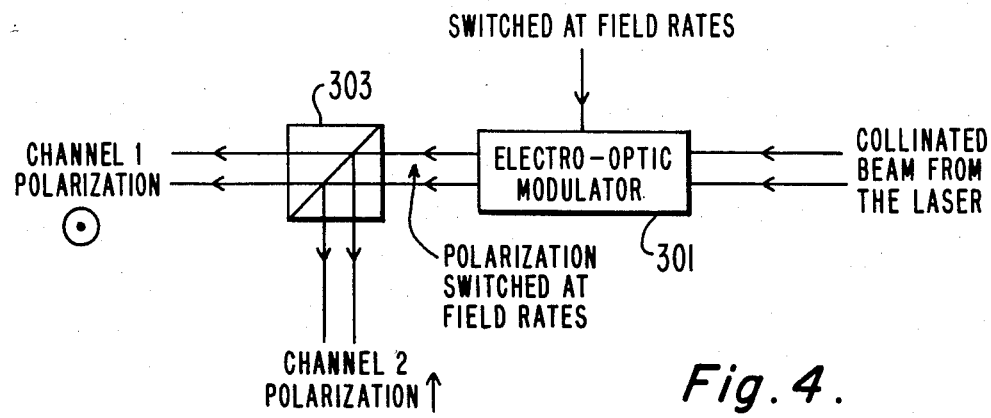
FIG. 4 shows another embodiment of the field switching device of FIG. 1.

An alternative arrangement for the field switching device is illustrated in FIG. 4. In the FIG. 4 embodiment, the laser beam from laser 3 is passed through an electro-optic modulator 301 which switches the polarization of the incident beam when a suitable signal is applied thereto. Polarized beam splitter 303 is arranged to intercept the light beam which passes through electro-optic modulator 301. The light beam incident on beam splitter 303 is directed in orthogonal directions (i.e., undeviated and deflected by 90°) at the switching rate. In operation, electro-optic modulator 301 is not activated for a field and thus the light beam passes through modulator 301 and splitter 303 undeflected. For a successive field the electro-optic modulator 301 is activated and causes rotation of the polarization of the light beam such that polarized beam splitter 303 deflects the light beam in a direction orthogonal to the original direction. In this manner, the light beam can be switched at the scanning rate to impinge on mirrors 25 and 27 alternatively.

Figure 5:
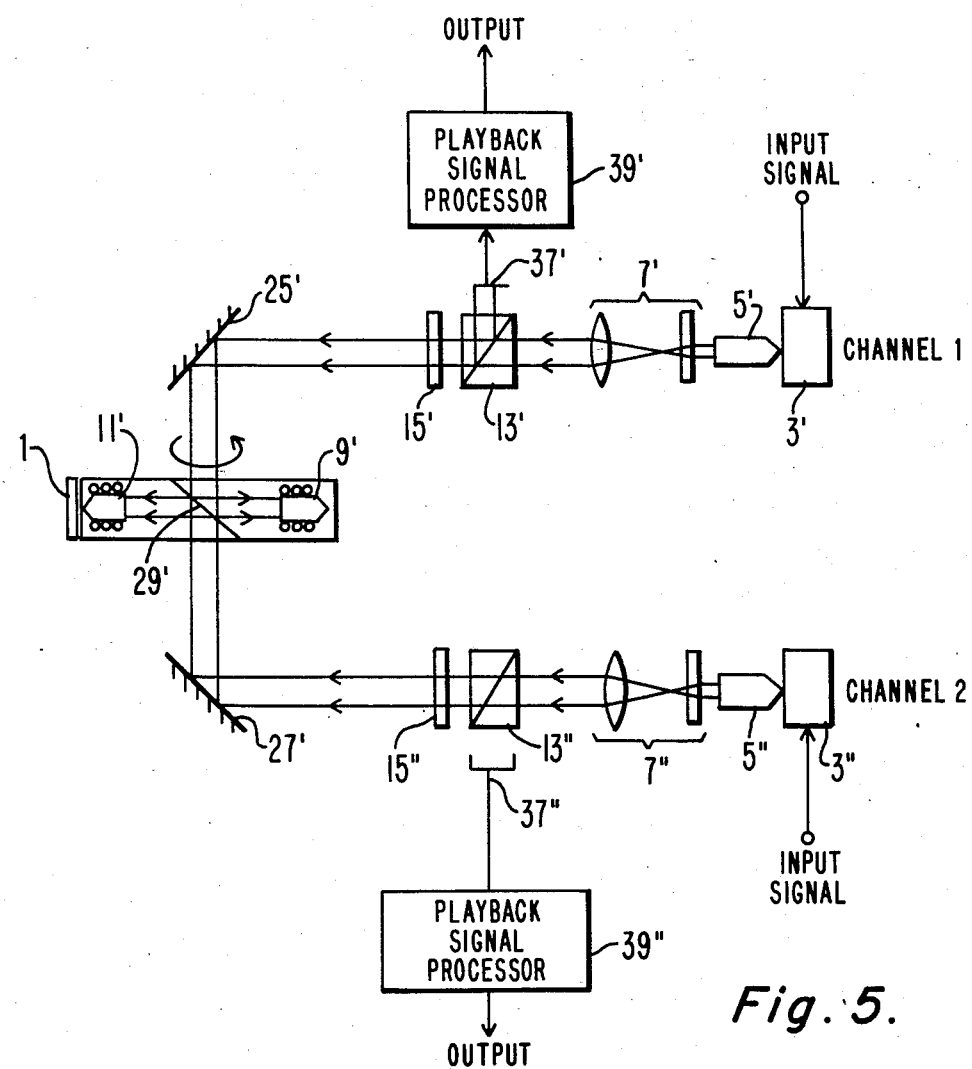
FIG. 5 is a plan view partially in block diagram form of another embodiment of the optical tape record and playback apparatus of the present invention.

A third embodiment for switching the information signals to successive tracks on the record medium is illustrated in FIG. 5. In this arrangement lasers 3' and 3" are used. Laser 3' emits a light beam in accordance with the input signal applied thereto which follows the path via elements 5', 7', 13', 15', 25', 29'(corresponding to elements 5, 7, 13, 15, 25, 29 of FIG. 1) to lens 9' which focuses the light beam on the desired information track of record medium 1. Laser 3", on the other hand, emits a light beam which follows the path via elements 5", 7", 13", 15", 27', 29' to lens 11'. As shown in FIG. 5, this arrangement is implemented with two detectors 37' and 37" and two playback signal processors 39' and 39" which operate in the same manner as the detector and signal processor of FIG. 1.

The mode of operation of the drive mechanisms (i.e., the linear motion of the tape and the rotary motion of the objective lenses) is chosen to be appropriate for helically scanning the information track on the surface of the record medium. To effect fine control of the spot location mirrors 25 and 27 of FIG. 1 and mirrors 25' and 27' of FIG. 5 can be pivoted which during the operation thereof causes the scanning spot to be displaced in the desired fashion on the record medium surface. The mirrors 25 and 27 are pivoted to maintain the scanning spot centered on an average centralized position along the information track. The pivotal movement of mirrors 25, 27 may be controlled by galvanometers (not shown). The mirror galvanometer and control circuitry therefor may be of a type described in U.S. Pat. No. 4,138,741 to L. V. Hedlund et al. issued on Feb. 6, 1979.

One of the advantages of the optical tape format is its relatively high storage capacity. Successive scan lines may have a center-to-center spacing of approximately $2\mu$ which contributes to this high information packing density. Because of the high packing density and close spacing, there is always a possibility that the focused spot will not lock onto the correct track as rotatable support 31 of FIG. 1 rotates and tape 1 passes across the record head 2. When the information recorded on the record medium 1 is in the form of video signals where each scan line corresponds to one field, failure to lock onto the correct track will result in playback of the video signal with field information either missing or out-of-sequence.

Figure 6:
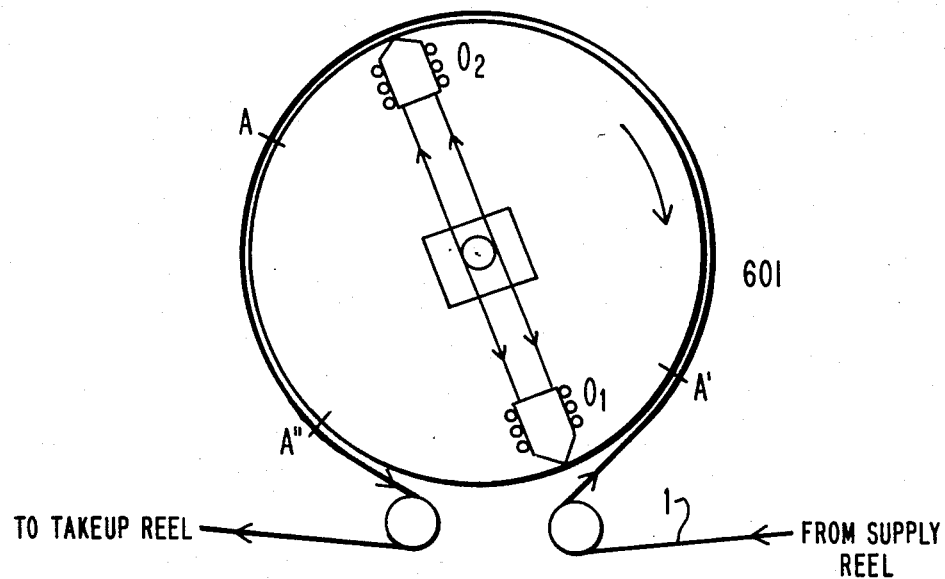
FIG. 6 is a plan view of another embodiment of the optical tape recording head of FIG. 5.

Referring to FIG. 6, schematic of an alternative optical tape recording head 601 which should tend to alleviate the aforementioned lock-on problem is illustrated. When the information recorded on record medium 1 is in the form of video signals, that portion of the signal corresponding to each field is recorded as each rotating objective $O_1$, $O_2$ successively passes through the arc AA' (i.e., approximately 180°) and a field identification sequence is recorded in arc A"A. Field identification arc A"A and field information arc AA' in combination are greater than 180°. During recording, successive fields of video information are switched alternately between the lasers 3' and 3" of FIG. 5.

Figure 7:
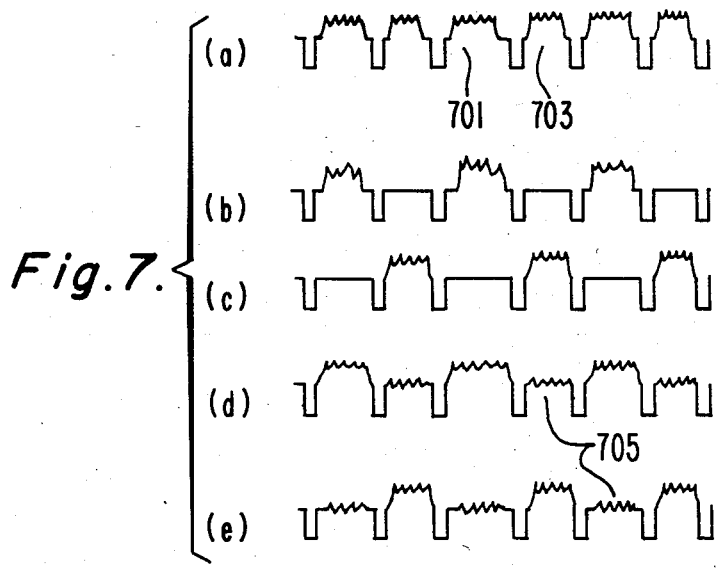
FIGS. 7a–7e illustrate information signal waveforms suitable for use with the present invention.

The recording of field sequence information is illustrated with reference to FIG. 7. Waveform (a) of FIG. 7 represents the input video signal illustrating successive fields 701, 703. Waveforms (b) and (c) illustrate the video input signal split between each laser channel, waveform (b) being applied to one laser and waveform (c) being applied to the other laser. Waveforms (d) and (e) represent waveforms (b) and (c) with the field identification sequence 705 added.

Figure 8:
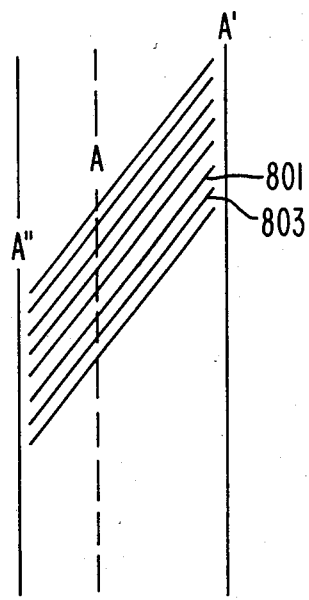
FIG. 8 is a plan view of a record medium having a helical information track separated into two sections used for field identification sequence information and field video information.

Referring to FIG. 8, information tracks 801 and 803 recorded in accordance with the apparatus of FIG. 6 are illustrated. Information tracks 801, 803 are separated into two sections: A"A of field identification sequence information and AA' of field video information.

Figure 9:
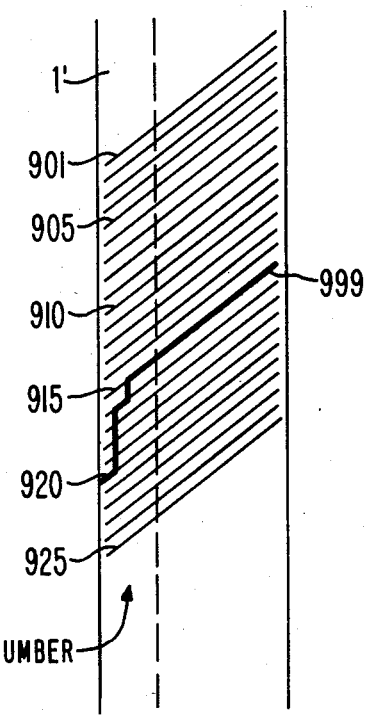
FIG. 9 illustrates a tracking scheme for a record medium encoded in accordance with one embodiment of the present invention.

An example of the lock-on technique is illustrated with reference to FIG. 9. Tracks 901 through 925 are recorded on the record medium 1. In this example, the next field video signal to be reproduced is recorded on track 915 and the focused spot initially locks onto track 920.

The location of the focused spot (i.e., track 920) is decoded by suitable decoding circuitry, compared to the desired track, and an error signal is transmitted to the galvanometer controlled mirror to deflect the mirror. After the focused spot locks into the new track (in this example, track 916), that track is identified and an additional deflection is made if necessary. This identification, deflection process is continued until the focused spot locks onto the correct track. In the example shown in FIG. 9, the focused spot locks onto track 915 after two deflections. The time required to identify the track and deflect the spot is approximately 1 m sec.; therefore, if the field identification sequence recorded along arc A"A is on the order of 5 m sec. duration, 4 or 5 iterations are permitted before the field video signal readout must commence. For further explanation of the operation of the lock-on procedure, reference may be made to U.S. application of A. E. Bell filed concurrently herewith entitled "SIGNAL FORMAT FOR OPTICAL TAPE RECORD/PLAYBACK SYSTEM."

While the principles of the present invention have been demonstrated with particular regard to the illustrative structures of FIGS. 1–9, it will be recognized that various departures from such illustrative structures may be undertaken in practice of the invention. For example, the diode lasers may be replaced with more conventional gas lasers and electro-optical modulators.

Further, it may be advantageous for archival purposes to overcoat the record medium structure to protect it from environmental effects. Overcoat structures for the record medium may be of a type described in U.S. Pat. No. 4,101,907 to A. E. Bell et al., issued on July 19, 1978.

We claim:

1. Apparatus for recording information signals, said apparatus comprising:
   an optical tape record medium;
   a source of radiant energy providing a beam of coherent light; said beam of coherent light being modulated in accordance with said information signals;
   a rotatable support;
   means for guiding said optical tape record medium in a substantially 180° arc adjacent to said rotatable support;
   first and second means, attached to said rotatable support, for focusing said coherent light beam to a first spot and a second spot, respectively on said optical tape record medium;
   means for establishing relative motion between said rotatable support and said optical tape record medium such that said first and second focused light spots scan said optical tape record medium in a helical fashion along the arc established by said guiding means; and
   means, in the path of said beam of coherent light, for switching said beam of coherent light between a first path and a second path, said first path coupling said beam of coherent light to said first focusing means during a first time interval during which said optical tape record medium is helically scanned by said coherent beam of light focused by said first focusing means and said second path coupling said coherent beam of light to said second focusing means during a second time interval during which said optical tape record medium is helically scanned by said coherent beam of light focused by said second focusing means; and
   means, attached to said rotatable support and common to said first and second path, for directing said coherent beam of light, when said coherent light beam approaches said rotatable support from a first direction during said first time interval, to said first focusing means and for directing said coherent beam of light, when said coherent beam of light approaches said rotatable support from a direction opposite to said first direction during said second time interval, to said second focusing means.

2. Apparatus for reproducing information signals, said apparatus comprising:
   an optical tape record medium having said information signals recorded thereon;
   a source of radiant energy providing a beam of coherent light;
   a rotatable support;
   means for guiding said optical tape record medium in a substantially 180° arc adjacent to said rotatable support;
   first and second means, attached to said rotatable support, for focusing said coherent light beam to a first spot and a second spot respectively on said optical tape record medium;
   means for establishing relative motion between said rotatable support and said optical tape record medium such that said first and second focused light spots scan said optical tape record medium in a helical fashion along the arc established by said guiding means;
   means, in the path of said beam of coherent light, for switching said beam of coherent light between a first path and a second path, said first path coupling said beam of coherent light to said first focusing means during a first time interval during which said optical tape record medium is helically scanned by said coherent beam of light focused by said first focusing means and said second path said coherent beam of light to second focusing means during a second time interval during which said optical tape record medium is helically scanned by said coherent beam of light focused by said second focusing means;
   means, attached to said rotatable support, and common to said first and second paths, for directing said coherent beam of light, when said coherent beam of light approaches said rotatable support from a first direction during said first time interval, to said first focusing means and for directing said coherent beam of light, when said coherent beam of light approaches said rotatable support from a direction opposite to said first direction during said second time interval, to said second focusing means; and
   light detection means, responsive to a light beam reflected from said optical tape record medium during the occurrence of said relative motion, for developing electrical signals representative of said recorded information signals.

3. Apparatus for recording information signals, said apparatus comprising:
   an optical tape record medium;
   first and second sources of radiant energy; each of said sources providing a beam of coherent light;
   a rotatable support;
   means for guiding said optical tape record medium in a substantially 180° arc adjacent to said rotatable support;
   first and second maans, attached to said rotatable support, for focusing said coherent light beams from said first and second sources respectively to spots on said optical tape record medium;

means for establishing relative motion between said rotatable support and said optical tape record medium such that said focused light spots of said coherent light beams scan said optical tape record medium in a helical fashion along the arc established by said guiding means;

first means for modulating said coherent light beam from said first source in accordance with said information signals during a first time interval during which said light beam from said first focusing means helically scans said 180° arc of said optical tape record medium;

second means for modulating said coherent light beam from said second source in accordance with said information signals during a second time interval during which said light beam from said second focusing means helically scans said 180° arc of said optical tape record medium; and means, attached to said rotatable support, for directing said light beam from said first source of radiant energy to said first focusing means during said first time interval and for directing said light beam from said second source of radiant energy to said second focusing means during said second time interval.

4. Apparatus for reproducing information signals, said apparatus comprising:

an optical tape record medium having said information signals recorded thereon;

first and second sources of radiant energy; each of said sources providing a beam of coherent light;

a rotatable support;

means for guiding said optical tape record medium in a substantially 180° arc adjacent to said rotatable support;

first and second means, attached to said rotatable support, for focusing said coherent light beams from said first and second source respectively to spots on said optical tape record medium;

means for establishing relative motion between said rotatable support and said optical tape record medium such that said focused light spots of said coherent light beams scan said optical tape record medium in a helical fashion along the arc established by said guiding means;

means, attached to said rotatable support, and common to said first and second paths, for directing said coherent beam of light, when said coherent beam of light approaches said rotatable support from a first direction during a first time interval, to said first focusing means and for directing said coherent beam of light, when said coherent beam of light approaches said rotatable support from a direction opposite to said first direction during a second time interval, to said second focusing means; and first light detection means, responsive to said light beam from said first source and reflected from said optical tape record medium during said first time interval, for developing electrical signals representative of said recorded information signals; and second light detection means, responsive to said light beam from said second source and reflected from said optical tape record medium during said second time interval, for developing electrical signals representative of said recorded information signals.

5. The apparatus according to claims 1 or 2 wherein said source of radiant energy comprises a laser diode.

6. The apparatus according to claims 3 or 4 wherein said sources of radiant energy comprise laser diodes.

7. The apparatus according to claims 1 or 2 wherein said switching means comprises a mirror driven by a galvanometer.

8. The apparatus according to claims 1 or 2 wherein said switching means comprises an electro-optic modulator.

* * * * *